J. GOOD.
CHAIN.

No. 108,473.　　　　　　　　　Patented Oct. 18, 1870.

Witnesses:
Fred. Haynes
Arthur Kinnier

Inventor:
John Good

United States Patent Office.

JOHN GOOD, OF BROOKLYN, NEW YORK.

Letters Patent No. 108,475, dated October 18, 1870.

IMPROVEMENT IN CHAINS.

The Schedule referred to in these Letters Patent and making part of the same.

*To all whom it may concern:*

Be it known that I, JOHN GOOD, of Brooklyn, in the county of Kings and State of New York, have invented a new and useful Improvement in Chains for Machines for Spreading Hemp, Flax, and other Fibrous Materials; and I do hereby declare that the following is a full, clear, and exact description of the same, reference being had to the accompanying drawing, forming part of this specification, and in which—

Figure 1:
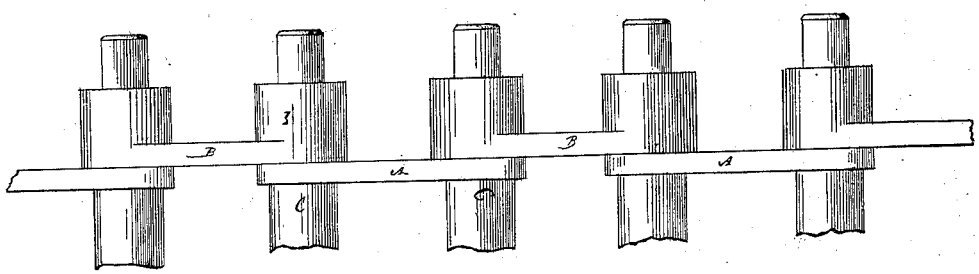
Figure 2:
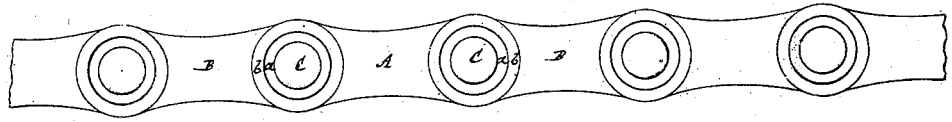

Figure 1 represents a horizontal or edge view of a section of my improved chain;

Figure 2, a side view of the same; and

Figure 3:
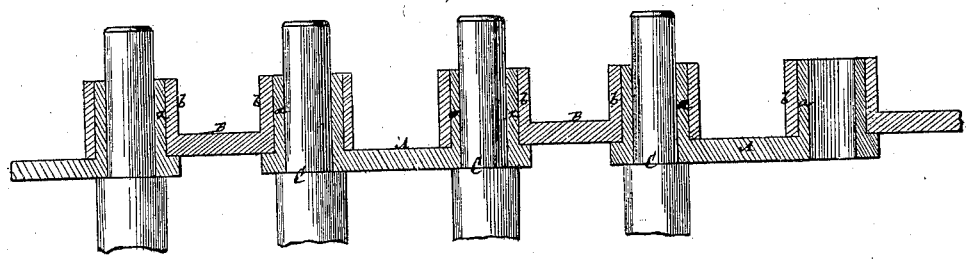

Figure 3, a horizontal section thereof.

Similar letters of reference indicate corresponding parts.

My improved chain, while applicable to other purposes or uses, is more especially designed for machines for "spreading" and forming into "slivers" hemp, flax, and other fibrous materials, and the improvement will here be described in such relation, as, for instance, in connection with the machine for such purpose previously invented by me, and secured by Letters Patent of the United States, bearing date October 5, 1869.

In such machine, the spreading, straightening, and stretching of the fiber was produced by a combination of two or more endless belts of combing or hackling-pins, arranged one before the other, and running at different velocities with the mechanism for presenting their operating points in, or nearly in, a plane.

These belts, and the belts in other machines for a like purpose, are each composed of two endless chains, placed at the requisite distance apart, and connected by transverse rods, the ends of which are inserted in the links of the two chains, in such manner as to turn therein, for the purpose of giving to the hackling-pins, which are attached to or carried by said rods, their requisite positions during the travel of the belts, by means of suitable guiding devices on the outer ends of the rods.

In such and other arrangements of the belts, it is very desirable that the transverse rods carrying the hackling-pins, should be at liberty to turn freely in the links of the chains, and that the links and the rods should have broad and steady bearings where they are connected the one with the other. This is not attained by the usual construction of such chains, inasmuch as the ends of the rods have their bearings in each two adjacent links of each chain, so that pull upon the chain is transferred from link to link through the rods, which causes a binding action on the rods.

My invention obviates this by making the eyes of the links with sockets or sleeves, arranged the one to fit and turn within the other, and arranging the ends of the rods to turn within the inner of such sleeves.

By this construction, the links are pivoted or jointed to each other independently of the rods and of other pins or fastenings.

Referring to the accompanying drawing—

A and B represent the links of one of the chains of a hackling-belt, and

C, the transverse rods which connect the one chain with the other to form a belt, and which carry the hackling-pins.

Said rods are reduced at their ends where they pass through the links, and have their bearing at each end exclusively within only one of two adjacent links, and a long and steady bearing provided for them at such part, by constructing each alternate link A with sleeves $a\ a$, for the ends of the rods to fit through, and the links are pivoted or jointed together independently of said rods, by causing the sleeves $a\ a$ of the one set of links to fit and turn in outer sleeves $b\ b$, formed in or on the intermediate links B. Thus pull on the chain is transferred from link to link without straining on the rods C, that are relieved of weight, and free to turn in long and steady bearings, and the links provided with broad, independent bearings the one upon the other at their joints.

What is here claimed, and desired to be secured by Letters Patent, is—

The combination of the links A and B with their sleeves $a$ and $b$ and the rods C, arranged in relation to each other to form a belt, composed of endless chains and transverse rods, free to turn in said chains, substantially as specified.

JOHN GOOD.

Witnesses:
 FRED. HAYNES,
 ARTHUR KINNIER.